United States Patent [19]
Hashimoto

[11] Patent Number: 5,341,264
[45] Date of Patent: Aug. 23, 1994

[54] DOUBLE LID STRUCTURE FOR TAPE CASSETTE

[75] Inventor: Keisuke Hashimoto, Kanagawa, Japan

[73] Assignee: Sony Corporation, Tokyo, Japan

[21] Appl. No.: 51,371

[22] Filed: Apr. 23, 1993

[30] Foreign Application Priority Data

May 12, 1992 [JP] Japan ................................. 4-145026
May 12, 1992 [JP] Japan ................................. 4-145028

[51] Int. Cl.⁵ ........................................... G11B 23/087
[52] U.S. Cl. .................................................. 360/132
[58] Field of Search .......................... 360/132; 242/199

[56] References Cited

U.S. PATENT DOCUMENTS 4,449,677 5/1984 Ohta et al. .......................... 360/132

Primary Examiner—Robert S. Tupper
Attorney, Agent, or Firm—William S. Frommer; Alvin Sinderbrand

[57] ABSTRACT

A tape cassette accommodating a magnetic tape therein includes a cassette body having a front opening across which a run of the tape is guided, an outer lid pivotally mounted on said cassette body for movements between opened and closed positions in respect to the front opening of the cassette body, a first inner lid disposed between the outer lid and the cassette body and pivoted in respect to the latter upon movement of the outer lid between its opened and closed positions, a second inner lid mounted either slidably or pivotally on the first inner lid for movement relative to the latter between an extended position and a retracted position, a driving mechanism for displacing the second inner lid to its extended and retracted positions relative to the first inner lid in response to movements of the outer lid to its closed and opened positions, respectively.

11 Claims, 13 Drawing Sheets

FIG. IA
PRIOR ART
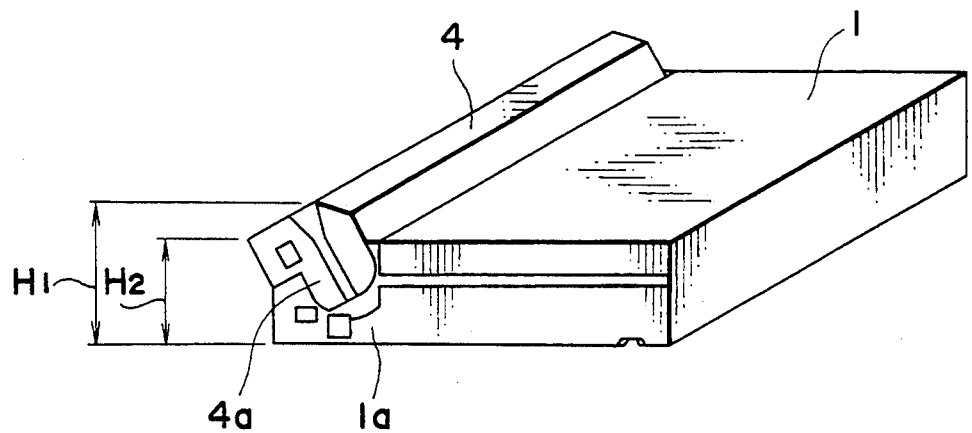
FIG. IB
PRIOR ART
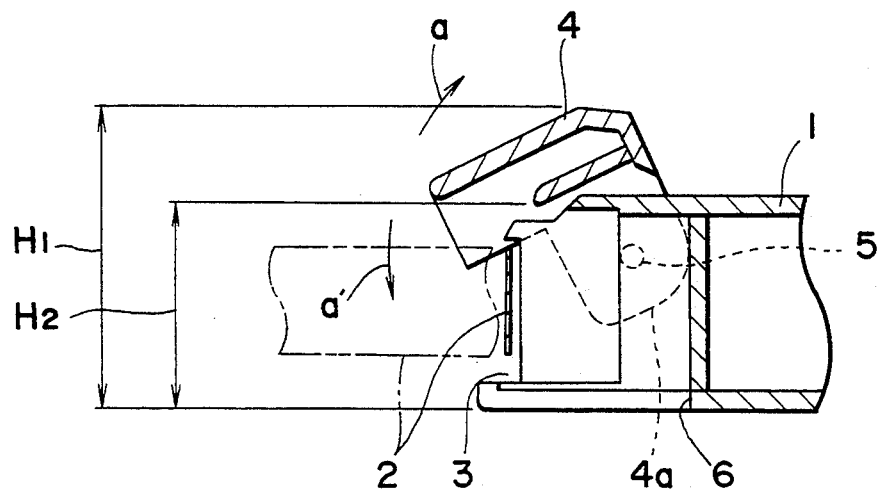

DOUBLE LID STRUCTURE FOR TAPE CASSETTE

BACKGROUND OF THE INVENTION

1. Field of the Invention

The present invention relates to a tape cassette such as a video cassette having a double lid structure formed by an outer lid and an inner lid.

2. Description of the Related Art

FIGS. 1A and 1B show a known video cassette in the related art. This video cassette has a cassette body 1 accommodating a magnetic tape 2. The cassette body 1 has a front opening 3 defining a path of the magnetic tape 2 drawn from the cassette body 1. The front opening 3 is adapted to be opened and closed by an outer lid 4 of a single lid structure. A pair of right and left side plates 4a of the outer lid 4 are pivotably connected through a pair of right and left pivot pins 5 to a pair of right and left outside walls 1a of the cassette body 1, respectively. Thus, the outer lid 4 is vertically pivotable about the pivot pins 5 in the opposite directions indicated by arrows a and a′, thereby opening and closing the front opening 3. The magnetic tape 2 is adapted to be drawn from the front opening 3 as shown by a two-dot chain line in FIG. 1B.

In this video cassette, the front opening 3 can be sufficiently opened with a small rotational angle of the outer lid 4. That is, as shown in FIG. 1B, a large opening amount $H_2$ of the front opening 3 can be ensured with a small opening amount $H_1$ of the outer lid 4. However, no inner lid is provided in the video cassette, so that the magnetic tape 2 in the front opening 3 is not completely enclosed. Accordingly, dust or the like entering through a bottom opening 6 of the cassette body 1 is apt to be attached to the magnetic tape 2, thus reducing the desired dustproof effect.

FIGS. 2A and 2B show another video cassette with an improved dustproof effect and which is known from U.S. Pat. No. 4,449,677. In this video cassette, an inner lid 7 is pivotably connected through a pair of right and left pivot pins 8 to the inside surface of an outer lid 4. A pair of right and left guide pins 9 are formed at the right and left ends of the inner lid 7 on the back side thereof, and a pair of right and left guide grooves 10 are formed in the opposed inside surfaces of a pair of right and left inside walls 1b of a cassette body 1, so as to guide the right and left guide pins 9, respectively. The outer lid 4 is adapted to be pivoted about a pair of right and left pivot pins 5 in the opposite directions of arrows a and a′, and the guide pins 9 of the inner lid 7 are adapted to be guided by the guide grooves 10 to move the inner lid 7 together with the outer lid 4 in the directions of the arrows a and a′, thereby opening and closing a front opening 3 of the cassette body 1.

As mentioned above, the video cassette shown in FIGS. 2A and 2B has a double lid structure formed by the outer lid 4 and the inner lid 7 to cover both the outside and inside surfaces of a magnetic tape 2 extending across the front opening 3 in the closed condition of the outer lid 4. That is, the magnetic tape 2 extending across the front opening 3 can be completely enclosed in the closed condition of the outer lid 4, thus improving the dustproof effect. However, a relatively large rotational angle of the outer lid 4 is required to raise the inner lid 7 to a sufficiently high level for clearing the tape 2. That is, if an opening amount $H_2$ of the front opening 3 is to be made equal to that in the video cassette shown in FIGS. 1A and 1B, an opening amount $H_1$ of the outer lid 4 will have to be considerably larger than that in the video cassette shown in FIGS. 1A and 1B.

A space to be occupied by the video cassette in a VTR is determined by the opening amount $H_1$ of the outer lid 4. Accordingly, the increase in the opening amount $H_1$ causes an increase in the occupied space to hinder reduction in the size of the VTR.

SUMMARY OF THE INVENTION

It is accordingly an object of the present invention to provide a tape cassette which can ensure a large opening amount of the inner lid with a relatively small opening amount of the outer lid.

According to a first aspect of the present invention, there is provided a tape cassette accommodating a magnetic tape therein, comprising a cassette body; an outer lid pivotably mounted to said cassette body for pivotal movements between a closed position covering an outer surface of the tape run and an opened position in which the outer lid is raised above the tape run; a first inner lid mounted on said outer lid and thereby pivoted in respect to said cassette body upon movement of said outer lid for covering an upper portion of an inner surface of the tape run in the closed position of the outer lid and for rising above the tape run in said opened position of the outer lid; a second inner lid mounted on said first inner lid for sliding movement relative to the latter between an extended edge-to-edge position and a retracted overlapping position approximately coextensive with the first inner lid; and driving means for sliding said second inner lid relative to said first inner lid in response to said pivotal movements of said outer lid so that the second inner lid is in its extended position for covering a lower portion of the inner surface of the tape run when the outer lid is in its closed position and so that the second inner lid is in its retracted position and thereby raised above the tape run when the outer lid is in its opened position.

In raising the first inner lid together with the outer lid, the second inner lid is slidably raised to substantially the same level as the first inner lid. Accordingly, the first and second inner lids can be raised to a sufficiently high level with a relatively small angular movement of the outer lid. That is, a sufficiently large opening amount of the cassette body can be ensured with a small opening amount of the outer lid. Accordingly, the space needed to accommodate the tape cassette in a recording and reproducing apparatus such as a VTR can be reduced to thereby make the recording and reproducing apparatus compact.

The outer lid and the first and second inner lids forming a double lid structure can improve the dustproof effect for the magnetic tape, so that the magnetic tape can be protected from dust.

Preferably, a first rack is provided on the cassette body; a second rack is provided on the second inner lid; and a pinion meshing with both the first and second racks is rotatably mounted on the first inner lid. In this case, when the outer lid is moved to its opened position, the pinion is turned by rolling along the first rack, and turning of the pinion causes displacement of the second rack and of the second inner lid therewith to the retracted overlapping position relative to the first inner lid so that the second inner lid is pivotally raised to substantially the same level as the first inner lid. Accordingly, the first and second inner lids can be raised to a sufficiently high level with a small rotational angle of the outer lid.

In another preferred embodiment of the invention, a rack is provided on the cassette body; a drive pinion meshing with the rack is rotatably mounted on the first inner lid; and a driven pinion meshing with the drive pinion is fixed to the second inner lid. In this case, the drive pinion is rotationally driven by the rack upon pivotal movements of the outer lid, and the driven pinion is simultaneously rotationally driven by the drive pinion to thereby pivot the second inner lid relative to the first inner lid. Accordingly, the second inner lid can be smoothly pivoted relative to the first inner lid in synchronism with the pivotal movement of the outer lid, thus effecting a smooth operation of the first and second inner lids.

Preferably, in opening the outer lid, the second inner lid is pivoted in such a direction as to move away from the magnetic tape. In this case, the second inner lid can be smoothly pivoted relative to the first inner lid so as not to contact the magnetic tape. Thus, there is no possibility of the magnetic tape being damaged by the second inner lid, thereby improving reliability.

Other objects and features of the invention will be more fully understood from the following detailed description and appended claims when taken with the accompanying drawings.

BRIEF DESCRIPTION OF THE DRAWINGS

FIG. 1A is a perspective view of a tape cassette in the related art;

FIG. 1B is a vertical sectional view of a front portion of the tape cassette shown in FIG. 1A;

DETAILED DESCRIPTION OF THE PREFERRED EMBODIMENTS

Figure 2A:
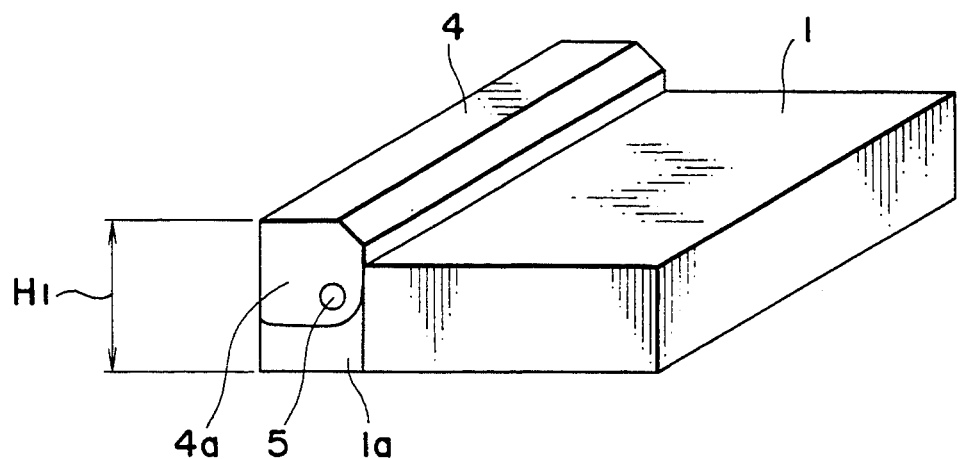
FIG. 2A is a perspective view of another tape cassette in the related art.
Figure 2B:
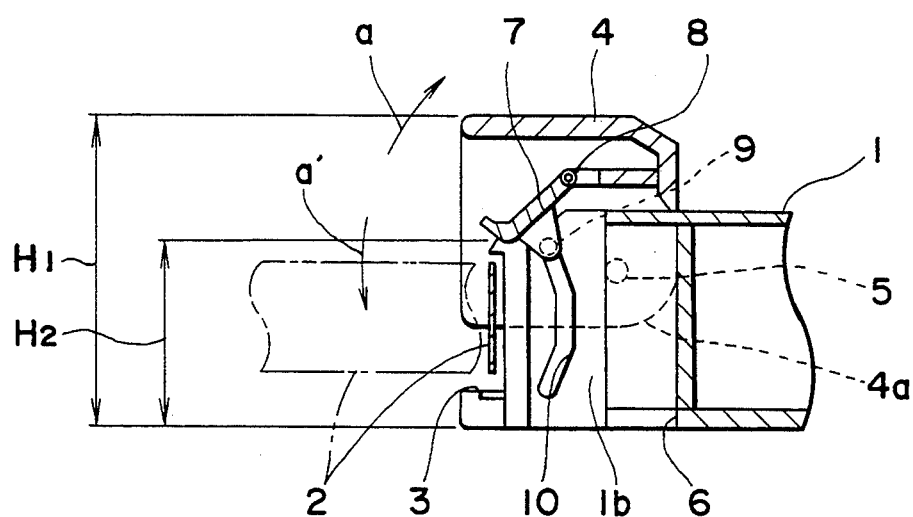
FIG. 2B is a vertical sectional view of a front portion of the tape cassette shown in FIG. 2A.

There will now be described a first preferred embodiment of the present invention with reference to FIGS. 3 to 8B, in which the same parts as those shown in FIGS. 2A and 2B are denoted by the same reference numerals, and the detailed explanation thereof will be omitted herein.

Figure 3:
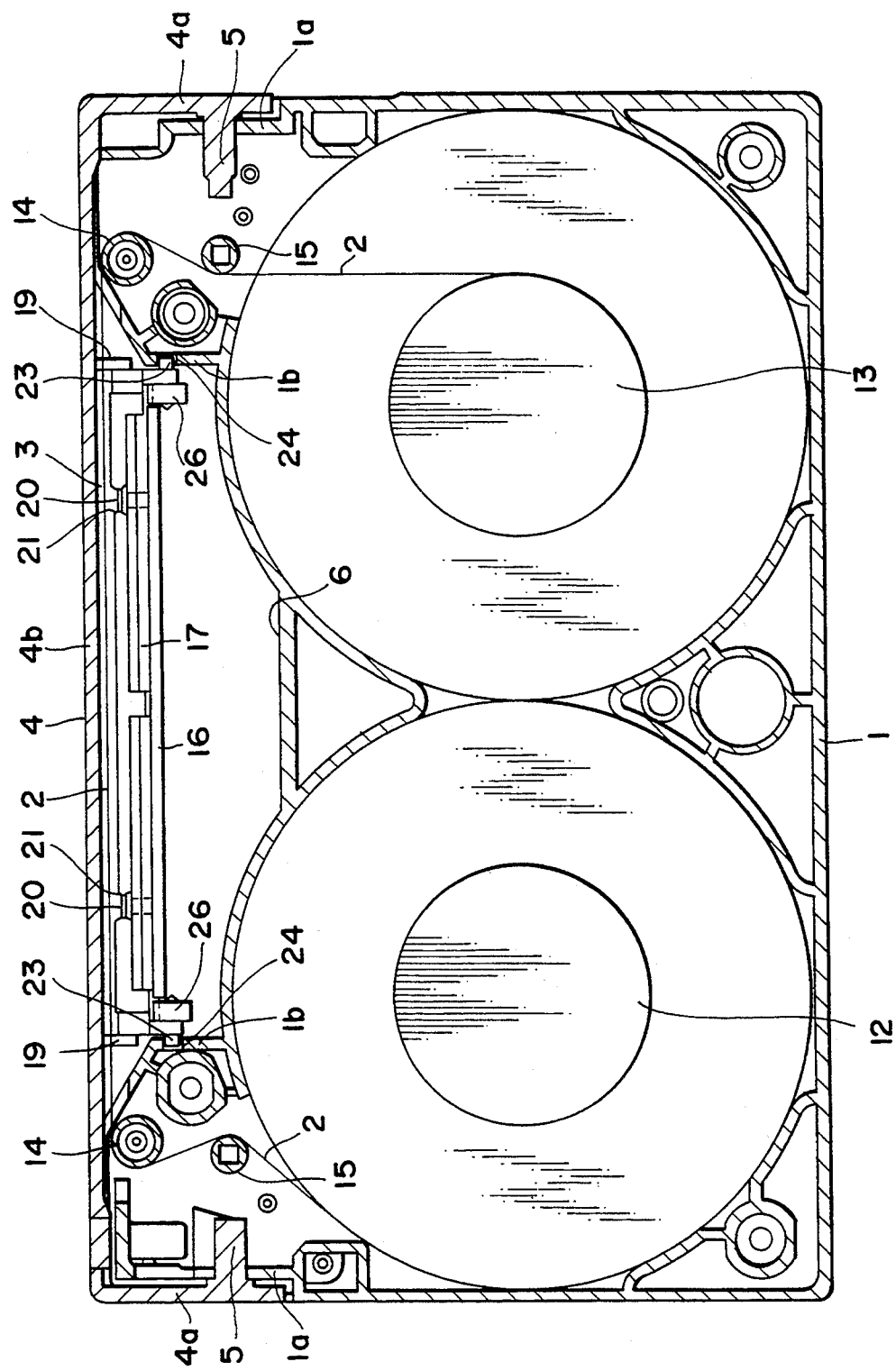
FIG. 3 is a horizontal sectional view in top plan of a tape cassette according to a first preferred embodiment of the present invention.

Referring to FIG. 3, reference numeral 1 generally designates a cassette body of a video cassette for use with a VTR. A pair of right and left reels 12 and 13 are rotatably accommodated in the cassette body 1. A magnetic tape 2 is wound around the right and left reels 12 and 13, and is guided therebetween by a pair of right and left tape guides 14 and a pair of right and left tape guides 15. A run of the guided magnetic tape 2 is stretched across a front opening 3 of the cassette body 1 between the right and left tape guides 14, and is allowed to transversely travel across the front opening 3. A bottom opening 6 of the cassette body 1 is contiguous to the front opening 3, and a pair of right and left inside walls 1b are formed integrally with the cassette body 1 at the right and left ends, respectively, of the bottom opening 6.

Figure 4A:
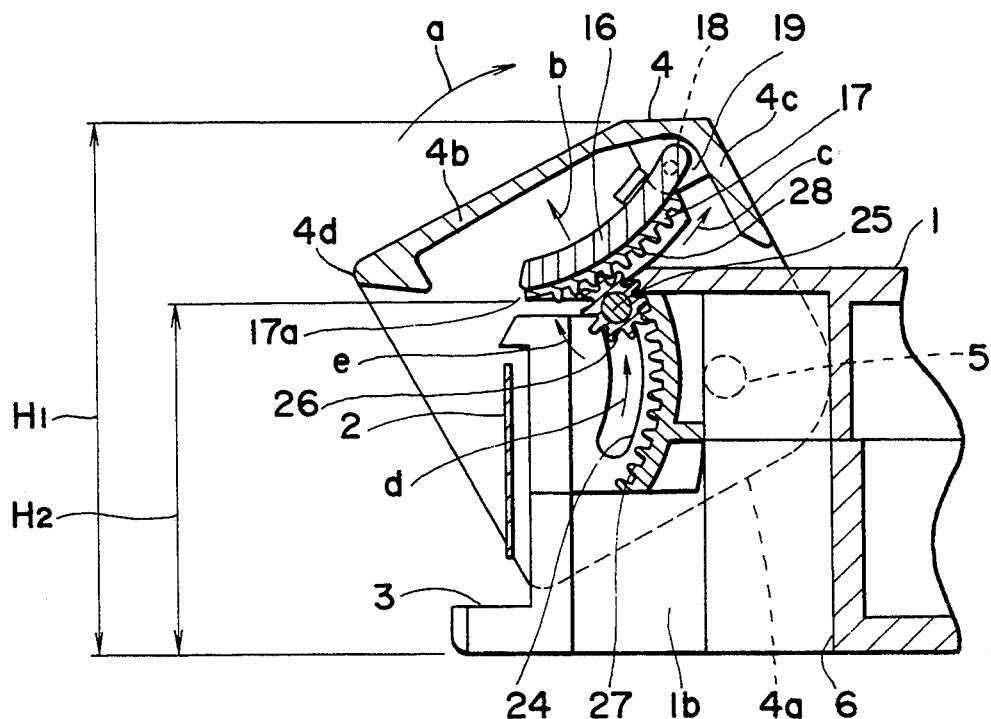
FIG. 4A is a vertical sectional view of a front portion of the tape cassette shown in FIG. 3 as taken along the line IV—IV in FIG. 6, and illustrating an open condition of an outer lid.
Figure 4B:
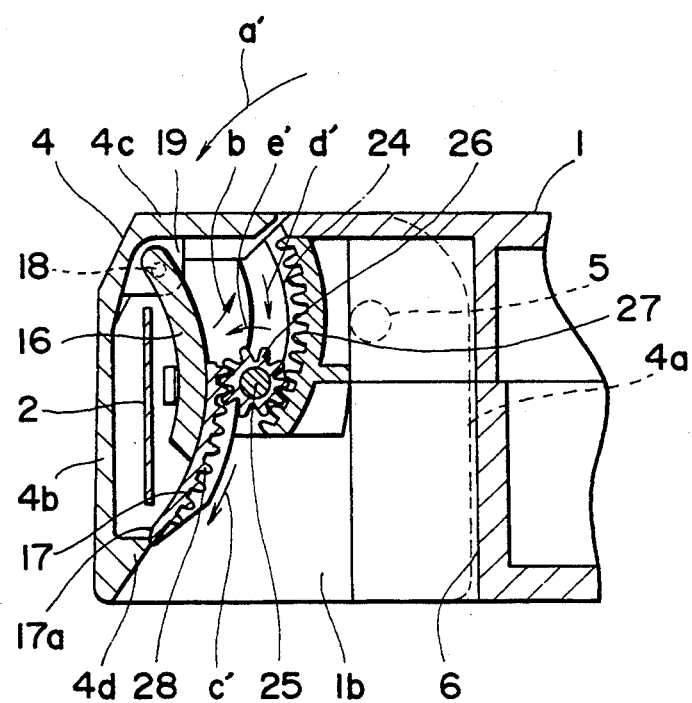
FIG. 4B is a view similar to FIG. 4A, but illustrating a closed condition of the outer lid.
Figure 6:
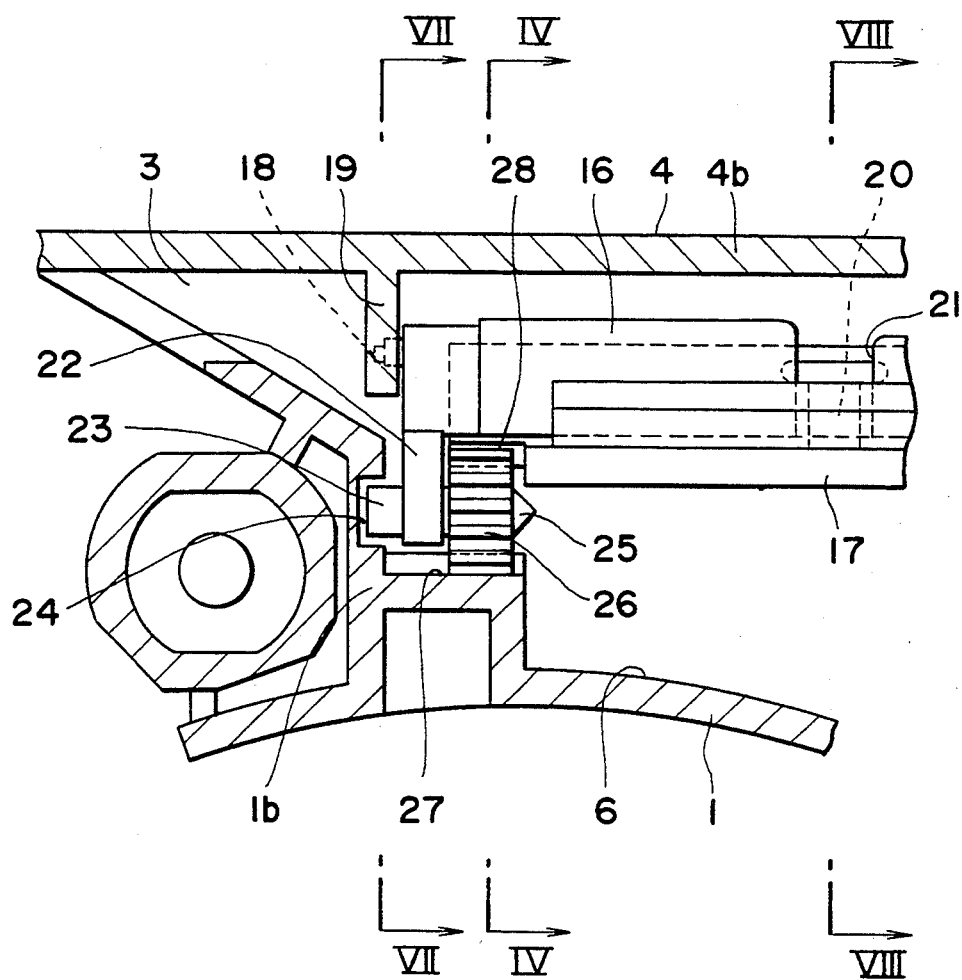
FIG. 6 is a horizontal sectional view in top plan of an essential part of the tape cassette shown in FIG. 3.

Referring to FIGS. 4A and 4B each showing a cross section taken along the line A—A in FIG. 6, reference numeral 4 denotes an outer lid having an L-shaped cross section defined by a normally vertical front plate 4b and a normally horizontal upper plate 4c formed integrally with each other. As shown in FIG. 3, a pair of right and left side plates 4a are formed integrally with the outer lid 4 at the right and left ends thereof, respectively, perpendicularly to the front plate 4b and the upper plate 4c. A pair of right and left coaxial pivot pins 5 are formed integrally with the right and left side plates 4a, respectively, so as to horizontally project from the inside surfaces of the side plates 4a. The right and left pivot pins 5 are rotatably supported in a pair of right and left outside walls 1a of the cassette body 1, respectively. Accordingly, the outer lid 4 is pivotably supported through the right and left pivot pins 5 on the cassette body 1 so that the right and left side plates 4a of the outer lid 4 are normally disposed outside the right and left outside walls 1a of the cassette body 1, respectively. More specifically, the outer lid 4 is pivotable about the common axis of the pivot pins 5 in an upward direction as depicted by an arrow a and a downward direction as depicted by an arrow a' between a closed position where the outer lid 4 covers the front and upper sides of the run of the magnetic tape 2 in the front opening 3 as shown in FIG. 4B and an open position where the outer lid 4 is opened to uncover the front side of the run of the magnetic tape 2 extending across the front opening 3 as shown in FIG. 4A.

As shown in FIGS. 3, and 4B, an upper inner lid 16 and a lower inner lid 17 are provided so that, in the closed position, the inner lids 16 and 17 are at the back or inner side of the run of the magnetic tape 2 extending across in the front opening 3 and extend between the right and left inside walls 1b of the cassette body 1 in substantially parallel relationship to the front plate 4b of the outer lid 4.

Figure 5:
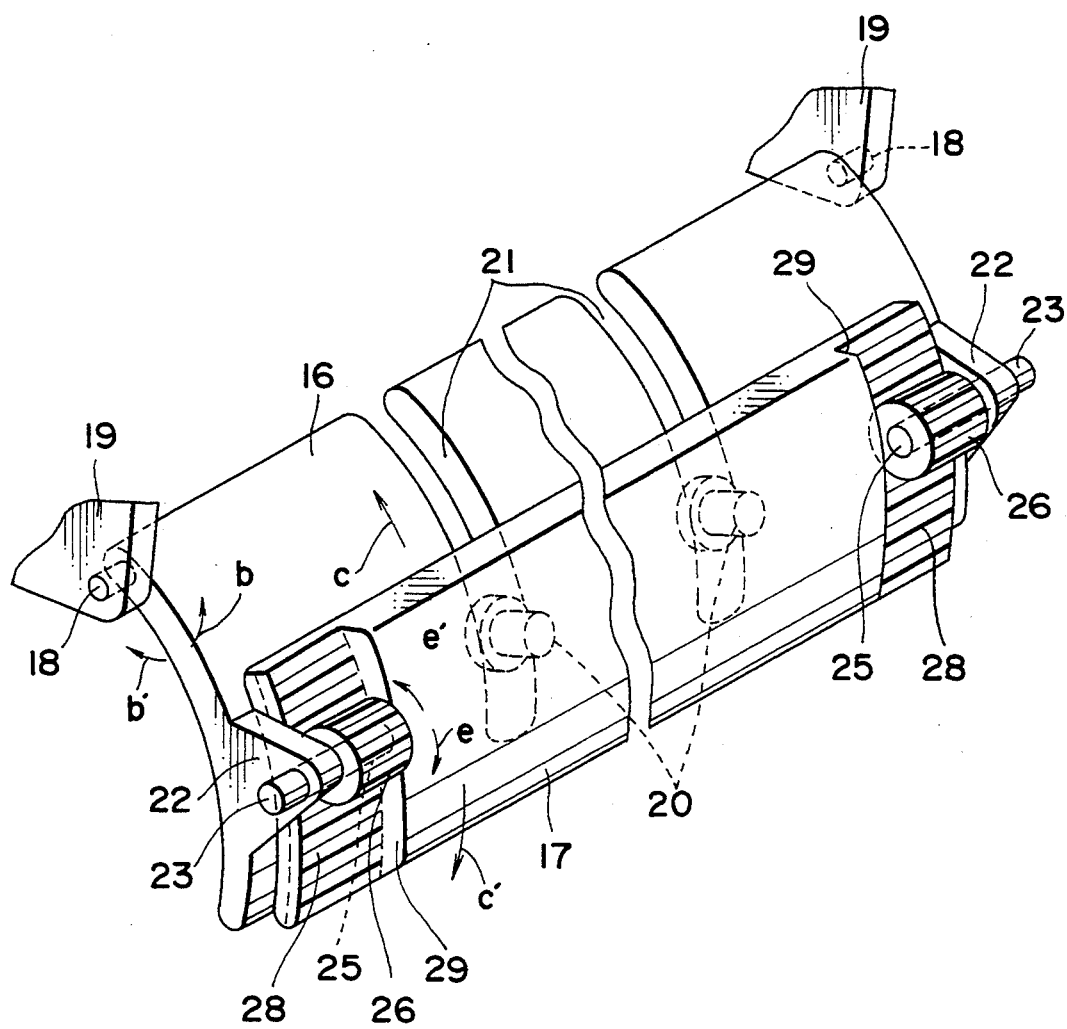
FIG. 5 is a perspective view of an essential part of the tape cassette shown in FIG. 3.

As shown in FIGS. 4A, 4B and 5, a pair of right and left coaxial pivot pins 18 are formed integrally with the upper inner lid 16 at the right and left ends thereof, respectively, that is, at the longitudinal opposite ends thereof so as to horizontally project from the right and left ends of the upper inner lid 16 at an upper end portion thereof. A pair of right and left lugs 19 are formed integrally with the outer lid 4 at the inside corner between the front plate 4b and the upper plate 4c. The right and left pivot pins 18 are rotatably supported in the right and left lugs 19, respectively. Accordingly, the upper inner lid 16 is pivotably connected to the outer lid 4 so as to be pivotable about the common axis of the pivot pins 18 in the opposite directions as depicted by arrows b and b'.

As shown in FIGS. 4A and 4B, the upper inner lid 16 and the lower inner lid 17 are arcuately curved in parallel to each other along the height of the front plate 4b so as to be convex in the direction facing rearwardly from the front plate 4b (i.e., rightward as viewed in FIGS. 4A and 4B). The lower inner lid 17 is in slidable contact with the back surface of the upper inner lid 16 (i.e., the right surface as viewed in FIGS. 4A and 4B). As shown in FIG. 5, a pair of right and left slide guides 20 are formed integrally with the lower inner lid 17 so as to project forward from the front surface of the lower inner lid 17 (i.e., the left surface as viewed in FIGS. 4A and 4B). A pair of right and left slide guide grooves 21 extend through the upper inner lid 16 so as to extend vertically from the upper end of the upper inner lid 16 toward the lower end thereof. The right and left slide guides 20 of the lower inner lid 17 are loosely engaged with the right and left slide guide grooves 21, respectively, so that the lower inner lid 17 can slide relative to the upper inner lid 16 in contact with the latter in an upward direction as depicted by an arrow c and a downward direction as depicted by an arrow c'.

As shown in FIG. 5, a pair of right and left lugs 22 are formed integrally with the upper inner lid 16 so as to project backward from the back surface of the upper inner lid 16 at the right and left ends thereof, respectively. A pair of right and left coaxial guide pins 23 are formed integrally with the right and left lugs 22, respectively, so as to project horizontally from the outside surfaces of the lugs 22. As shown in FIGS. 4A, 4B and 6, a pair of right and left guide grooves 24 are formed on the opposed inside surfaces of the right and left inside walls 1b of the cassette body 1, respectively, so as to extend arcuately in the vertical direction. The right and left guide pins 23 of the upper inner lid 16 are loosely engaged with the right and left guide grooves 24 of the cassette body 1, respectively. The guide grooves 24 are arcuately curved so as to be convex in the direction facing backward from the run backward of the magnetic tape 2 stretched across in the front opening 3.

As shown in FIGS. 5 and 6, a pair of right and left coaxial support shafts 25 are formed integrally with the right and left lugs 22, respectively, so as to project horizontally from the inside surfaces of the lugs 22 in coaxial relationship with the guide pins 23. A pair of right and left pinions 26 are rotatably mounted on the outer circumferences of the right and left support shafts 25, respectively. As shown in FIGS. 4A, 4B and 6, a pair of right and left first racks 27 are formed on a pair of right and left inside walls of the cassette body 1 perpendicular to the right and left inside walls 1b so as to arcuately extend along the right and left guide grooves 24 in parallel relationship thereto, respectively. As shown in FIG. 5, a pair of right and left second racks 28 are formed on the back surface of the lower inner lid 17 at the right and left end portions thereof, respectively, so as to arcuately extend over the width of the lower inner lid 17. As shown in FIGS. 4A and 4B, the left pinion 26 is in mesh with both the left first rack 27 and the left second rack 28 so as to be radially interposed therebetween. Similarly, the right pinion 26 is in mesh with both the right first rack 27 and the right second rack 28 so as to be radially interposed therebetween. As shown in FIG. 5, a pair of right and left shoulders 29 are formed on the back surface of the lower inner lid 17 along the inside edges of the right and left second racks 28, respectively. The left pinion 26 is axially interposed between the left shoulder 29 and the left lug 22 so as not to escape from the left support shaft 25. Similarly, the right pinion 26 is axially interposed between the right shoulder 29 and the right lug 22 so as not to escape from the right support shaft 25.

The operation of the first preferred embodiment having the above-mentioned construction will now be described with reference to FIGS. 4A to 8B.

Figure 7A:
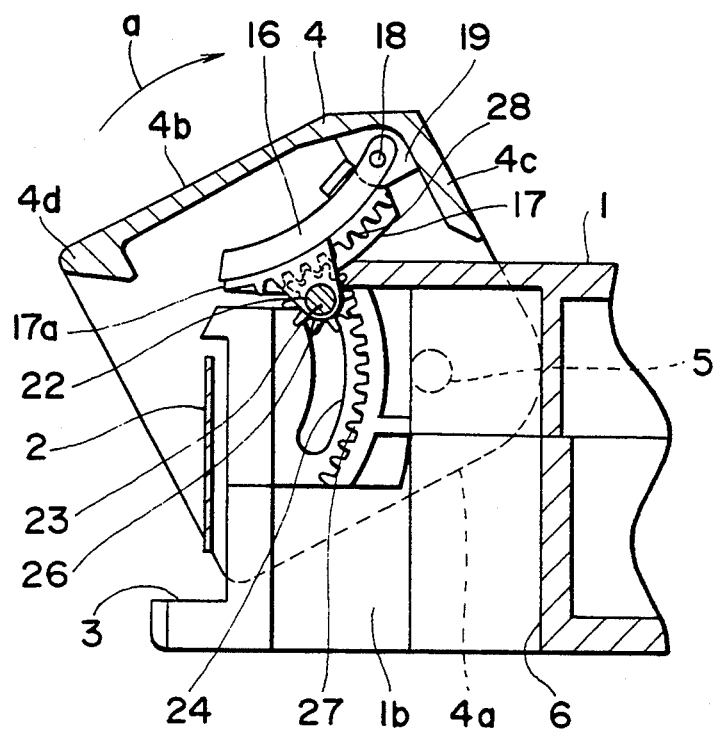
FIG. 7A is a cross section taken along the line VII—VII in FIG. 6, and illustrating the open condition of the outer lid.
Figure 7B:
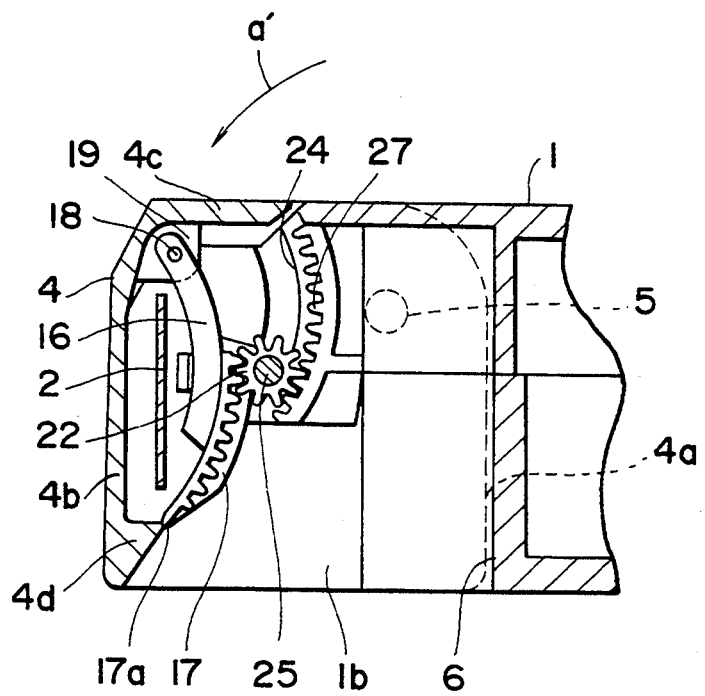
FIG. 7B is a view similar to FIG. 7A, but illustrating the closed condition of the outer lid.
Figure 8A:
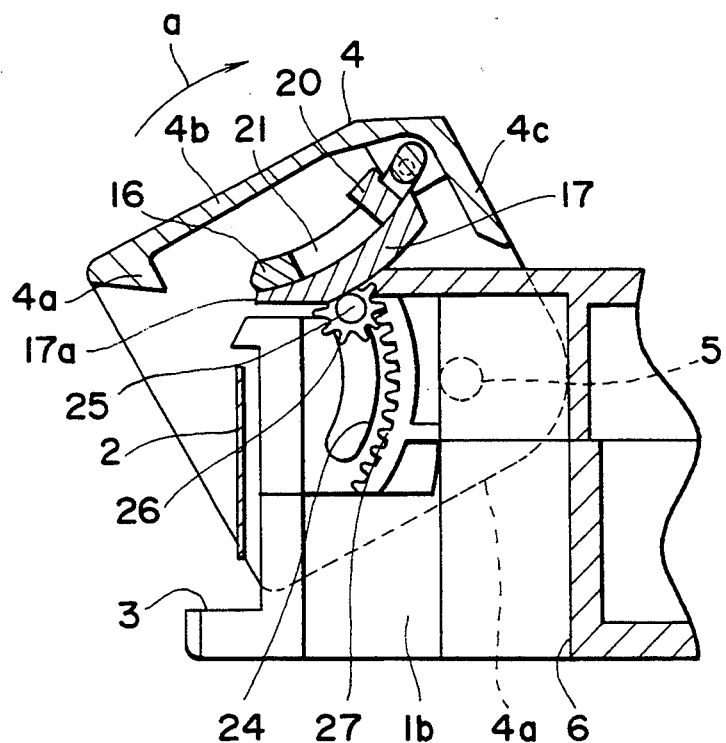
FIG. 8A is a cross section taken along the line VIII—VIII in FIG. 6, illustrating the open condition of the outer lid.
Figure 8B:
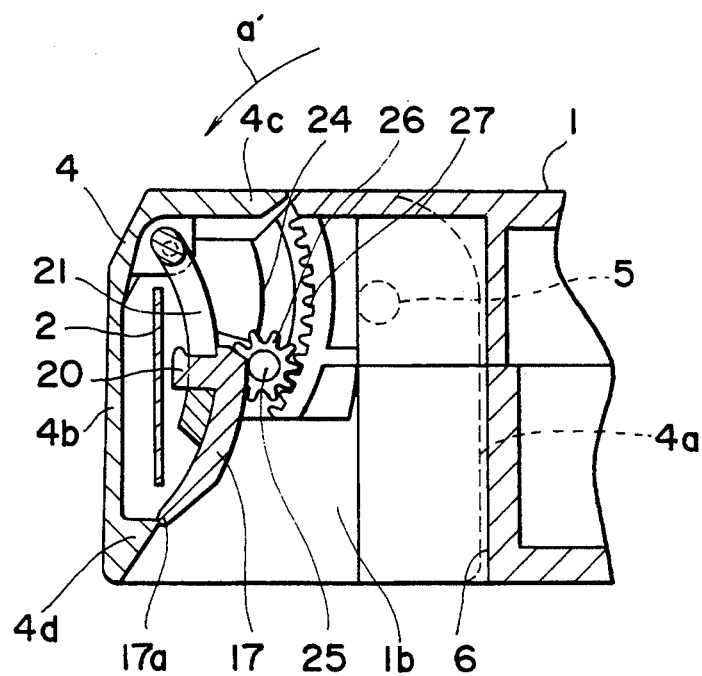
FIG. 8B is a view similar to FIG. 8A, but illustrating the closed condition of the outer lid.

In the condition shown in FIGS. 4B, 7B and 8B, the outer lid 4 is in the closed position to close the front opening 3 so that the front and upper sides of the magnetic tape 2 are covered with the front plate 4b and the upper plate 4c of the outer lid 4, respectively, and the front plate 4b and the upper plate 4c are in the vertical and horizontal positions, respectively. In this condition, the lower inner lid 17 is in an extended edge-to-edge position or depends downward from the upper inner lid 16 so that a lower edge 17a of the lower inner lid 17 abuts against a lower edge 4d of the front plate 4b of the outer lid 4. Thus, the front and back sides and the upper and lower sides of the magnetic tape 2 stretched across the front opening 3 are fully covered with the front plate 4b and the upper plate 4c of the outer lid 4, the upper inner lid 16 and the lower inner lid 17.

Accordingly, the dustproof effect for the magnetic tape 2 can be improved to protect the magnetic tape 2 from dust.

When the outer lid 4 is pivoted about the common axis of the right and left pivot pins 25 in the direction of the arrow a from the closed position shown in FIGS. 4B, 7B and 8B to the open position shown in FIGS. 4A, 7A and 8A, the upper inner lid 16 is raised together with the outer lid 4 through the right and left pivot pins 18 in the direction of the arrow a while being pivoted about the common axis of the pivot pins 18.

Just after starting of the above raising operation of the upper inner lid 16 in the direction of the arrow a, the right and left guide pins 23 of the upper inner lid 16 are guided by the right and left arcuate guide grooves 24 of the cassette body 1 to thereby pivot the upper inner lid 16 about the common axis of the pivot pins 18 in the direction of the arrow b. Accordingly, the upper inner lid 16 is moved away from the magnetic tape 2 in the backward direction (i.e., in the rightward direction as viewed in FIGS. 4A and 4B), so that the upper inner lid 16 can be smoothly raised without interfering with the magnetic tape 2. Thereafter, prior to ending of the raising operation of the upper inner lid 16 in the direction of the arrow a, the upper inner lid 16 is pivoted about the common axis of the pivot pins 18 in the direction of the arrow b', and is raised in substantially parallel relationship to the front plate 4b of the outer lid 4. Accordingly, the upper inner lid 18 can be raised to a level sufficiently higher than that of the upper end of the magnetic tape 2.

During the raising operation of the upper inner lid 16 together with the outer lid 4 in the direction of the arrow a, the right and left pinions 26 are raised by the right and left support shafts 25 of the upper inner lid 16 along the right and left guide grooves 24 in a direction as depicted by an arrow d.

During the raising operation of the right and left pinions 26 roll along and in the direction of the arrow d, the right and left pinions 26 are rotationally driven by the right and left first racks 27 of the cassette body 1. That is, the right and left pinions 26 are rotated about the right and left support shafts 25 in a direction depicted by an arrow e.

As a result, the right and left second racks 28 of the lower inner lid 17 are driven by the right and left pinions 26 in the direction of the arrow c, so that the lower inner lid 17 is slid on the back surface of the upper inner lid 16 in the direction of the arrow c so as to overlap or be substantially coextensive with the upper lid 16 while being guided by the right and left slide guides 20 in the right and left slide guide grooves 21. Thus, the lower inner lid 17 is raised in the direction of the arrow c to substantially the same level as that of the upper inner lid 16, thereby fully uncovering the front and back sides and the upper and lower sides of the magnetic tape 2.

On the other hand, when the outer lid 4 is lowered from the open position shown in FIGS. 4A, 7A and 8A to the closed position shown in FIGS. 4B, 7B and 8B in the direction of the arrow a', the operation is carried out in a manner reverse to that described above. That is, the pinions 26 are lowered in a direction depicted by an arrow d' while being guided by the support shafts 25 and the guide grooves 24, and are simultaneously rotated about the support shafts 25 in a direction depicted by an arrow e'. Accordingly, the lower inner lid 17 is slid downward on the back surface of the upper inner lid 16 in the direction of the arrow c' for return to its extended position.

As mentioned above, in raising the upper inner lid 16 together with the outer lid 4 in the direction of the arrow a to the open position, the lower inner lid 17 can be slidingly raised to substantially the same level as that of the upper inner lid 16. That is, the upper inner lid 16 and the lower inner lid 17 can be raised to a sufficiently high level by pivoting the outer lid 4 through a relatively small angle.

Accordingly, as shown in FIG. 4A, a sufficient opening amount $H_2$ of the front opening 3 can be ensured with a reduced raising mount $H_1$ of the outer lid 4.

While a specific embodiment of the present invention has been described above, the present invention is not limited to the above preferred embodiment, but various modifications may be made within the scope of the present invention.

For example, the pinions 26 may be replaced by a pair of friction rollers such as rubber rollers; the first racks 27 may be replaced by a pair of friction drive surfaces formed by attaching rubber plates to the inside walls of the cassette body 1, for example; and the second racks 28 may be replaced by a pair of friction driven surfaces formed by attaching rubber plates to the lower inner lid 17, for example. In this case, when the upper inner lid 16 is raised or lowered in the direction of the arrow a or a', the friction rollers are rotationally driven by the friction drive surfaces, and the friction driven surfaces are simultaneously driven by the friction rollers, thereby sliding the lower inner lid 17 on the back surface of the upper inner lid 16 in the direction of the arrow c or c'.

Further, the present invention is not limited to a video cassette for use with a VTR, but it may be applied to various tape cassettes for use with various recording and reproducing apparatus.

There will now be described a second preferred embodiment of the present invention with reference to FIGS. 9 to 13B, in which the same parts as those shown in FIGS. 2A and 2B are denoted by the same reference numerals plus 100, and the detailed explanation thereof will be omitted herein.

Figure 9:
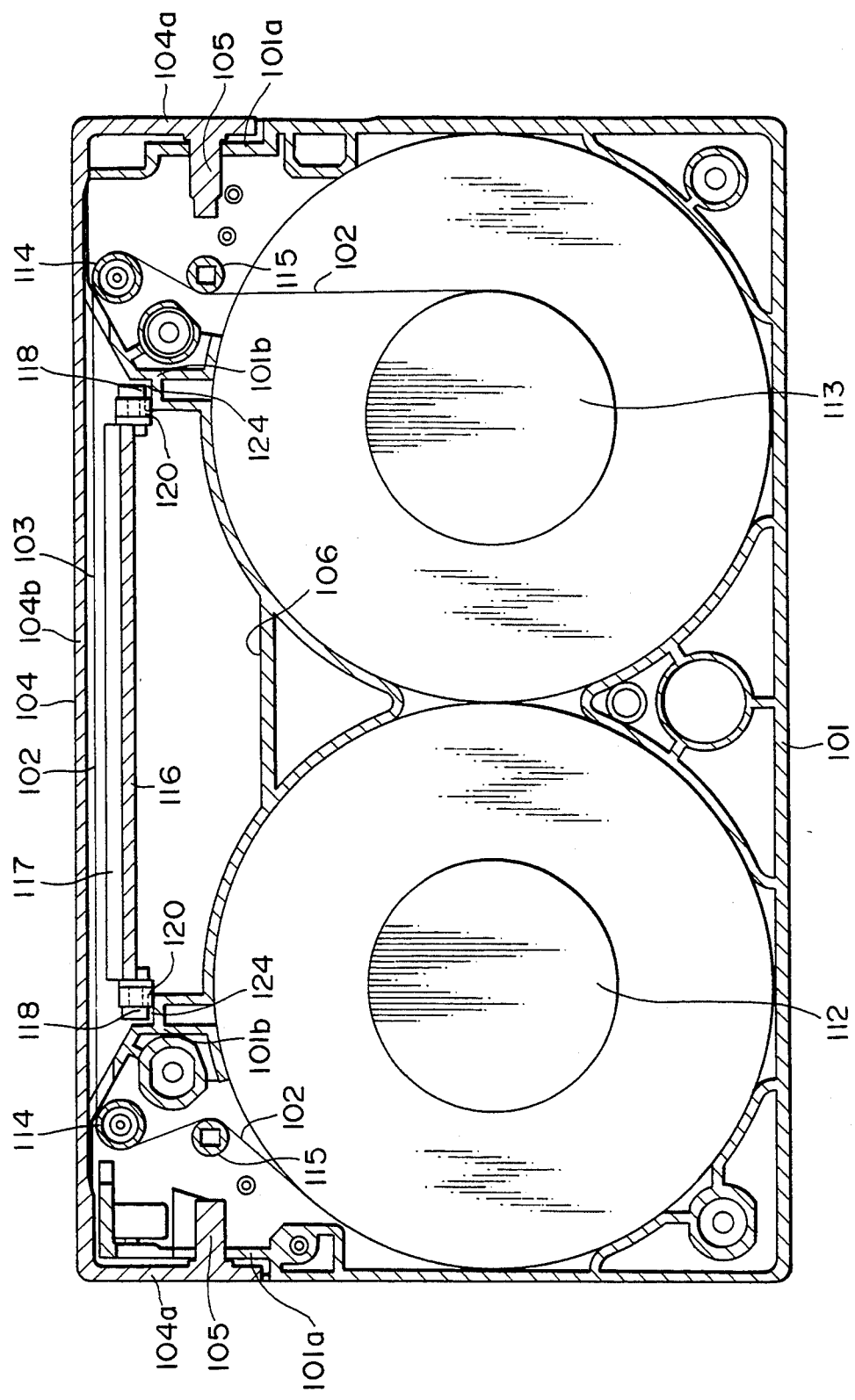
FIG. 9 is a horizontal sectional view in top plan of a tape cassette according to a second preferred embodiment of the present invention.

Referring to FIG. 9, reference numeral 101 generally designates a cassette body of a video cassette for use with a VTR. A pair of right and left reels 112 and 113 are rotatably accommodated in the cassette body 101. A magnetic tape 102 is wound around the right and left reels 112 and 113, and is guided by a pair of right and left tape guides 114 and a pair of right and left tape guides 115. A run of the magnetic tape 102 is stretched across a front opening 103 of the cassette body 101 between the right and left tape guides 114, and is allowed to transversely travel across the front opening 103. A bottom opening 106 of the cassette body 101 is contiguous to the front opening 103, and a pair of right and left inside walls 101b are formed integrally with the cassette body 101 at the right and left ends of the bottom opening 106, respectively.

Figure 10A:
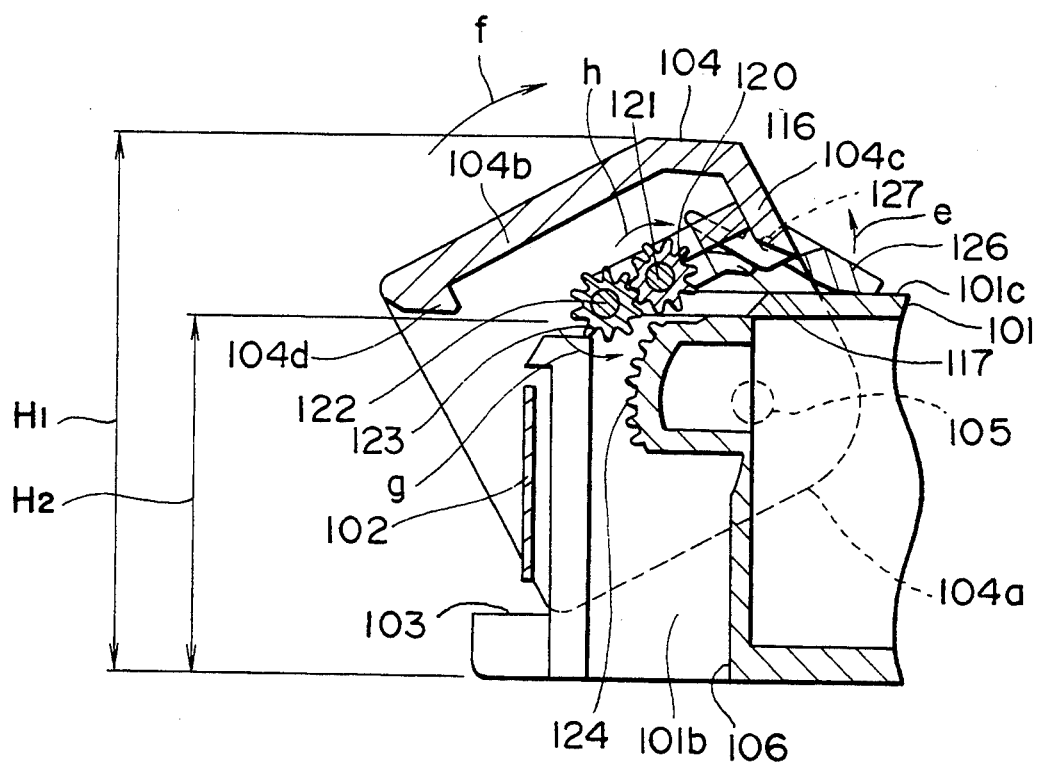
FIG. 10A is a vertical sectional view of a front portion of the tape cassette shown in FIG. 9 as taken along the line X—X in FIG. 11, and illustrating an open condition of an outer lid.
Figure 10B:
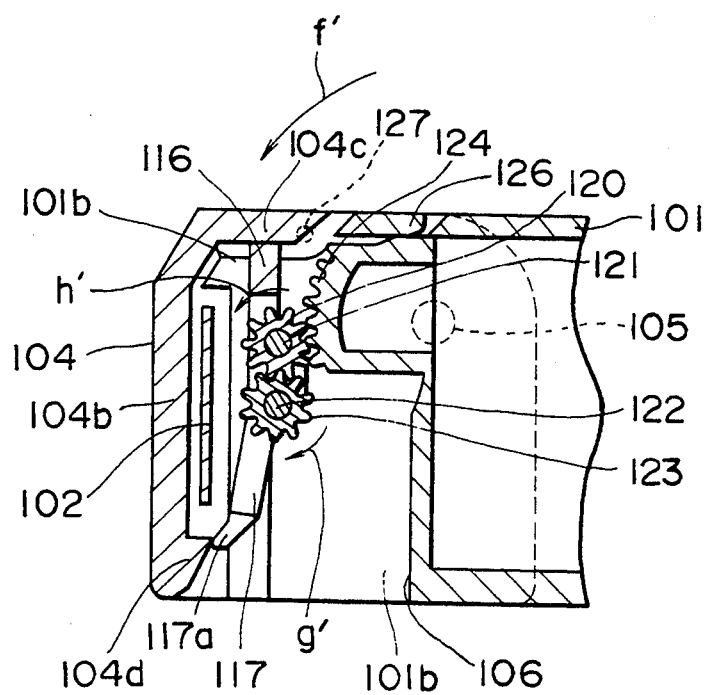
FIG. 10B is a view similar to FIG. 10A, but illustrating a closed condition of the outer lid.

Referring to FIGS. 10A and 10B reference numeral 104 denotes an outer lid having an L-shaped cross section defined by a normally vertical front plate 104b and a normally horizontal upper plate 104c formed integrally with each other. As shown in FIG. 9, a pair of right and left side plates 104a are formed integrally with the outer lid 104 at the right and left ends thereof, respectively, perpendicularly to the front plate 104b and the upper plate 104c. A pair of right and left coaxial pivot pins 105 are formed integrally with the right and left side plates 104a, respectively, so as to horizontally project from the inside surfaces of the side plates 104a. The right and left pivot pins 105 are rotatably supported in a pair of right and left outside walls 1a of the cassette body 101, respectively. Accordingly, the outer lid 104 is pivotably connected through the right and left pivot pins 105 to the cassette body 101 so that the right and left side plates 104a of the outer lid 104 are normally disposed outside the right and left outside walls 101a of the cassette body 101, respectively. More specifically, the outer lid 104 is pivotable about the common axis of the pivot pins 105 in an upward direction as depicted by an arrow f and a downward direction as depicted by an arrow f' between a closed position where the outer lid 104 is closed to cover the front and upper sides of the magnetic tape 102 in the front opening 103 as shown in FIG. 10B and an open position where the outer lid 104 is opened to uncover the front side of the magnetic tape 102 in the front opening 103 as shown in FIG. 10A.

As shown in FIGS. 9, and 10B, in the closed position, an upper inner lid 116 and a lower inner lid 117 are provided in back of the magnetic tape 102 extended across the front opening 103 so as to extend between the right and left inside walls 101b of the cassette body 101 in substantially parallel relationship to the front plate 104b of the outer lid 104. The upper inner lid 117 is formed integrally with the upper plate 104b of the outer lid 104 so as to project from the lower surface of the upper plate 104b in perpendicular relationship thereto. The lower inner lid 117 is operatively connected to a lower end portion of the upper inner lid 116.

Figure 11:
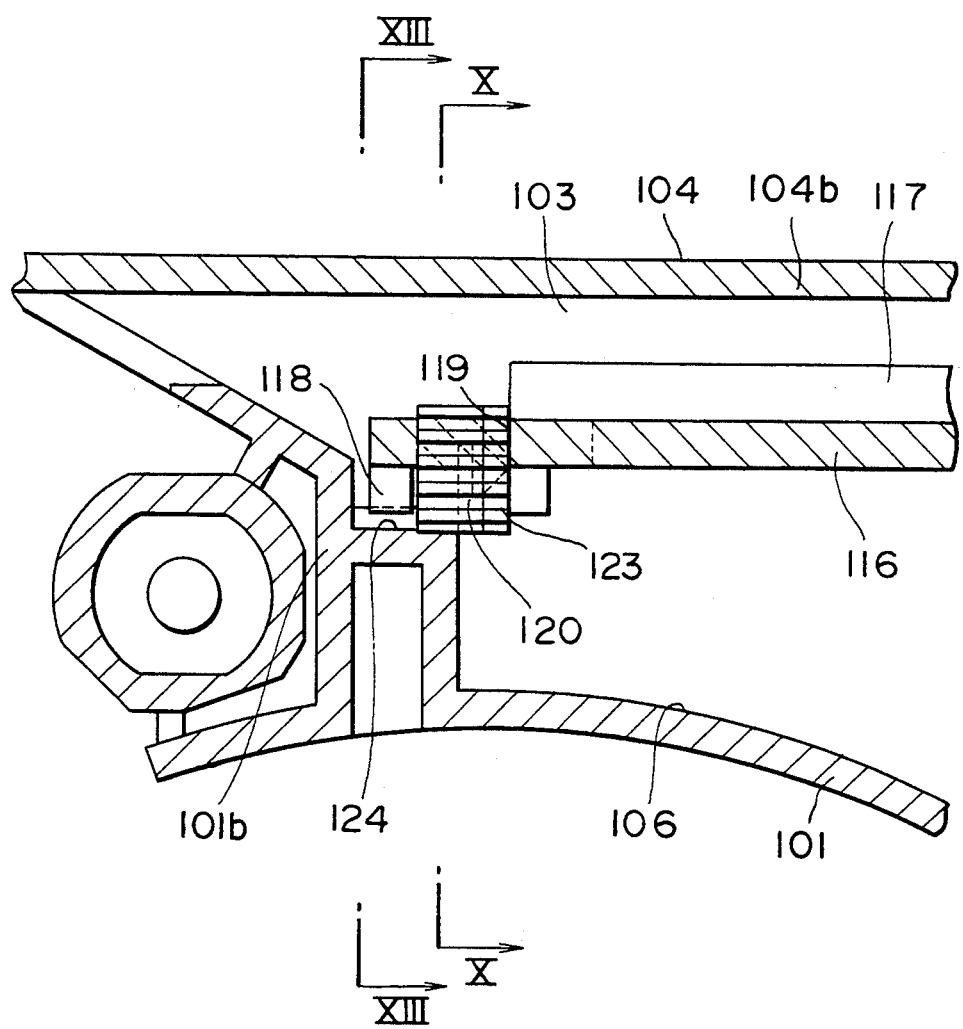
FIG. 11 is a horizontal sectional view in top plan of an essential part of the tape cassette shown in FIG. 9.
Figure 12:
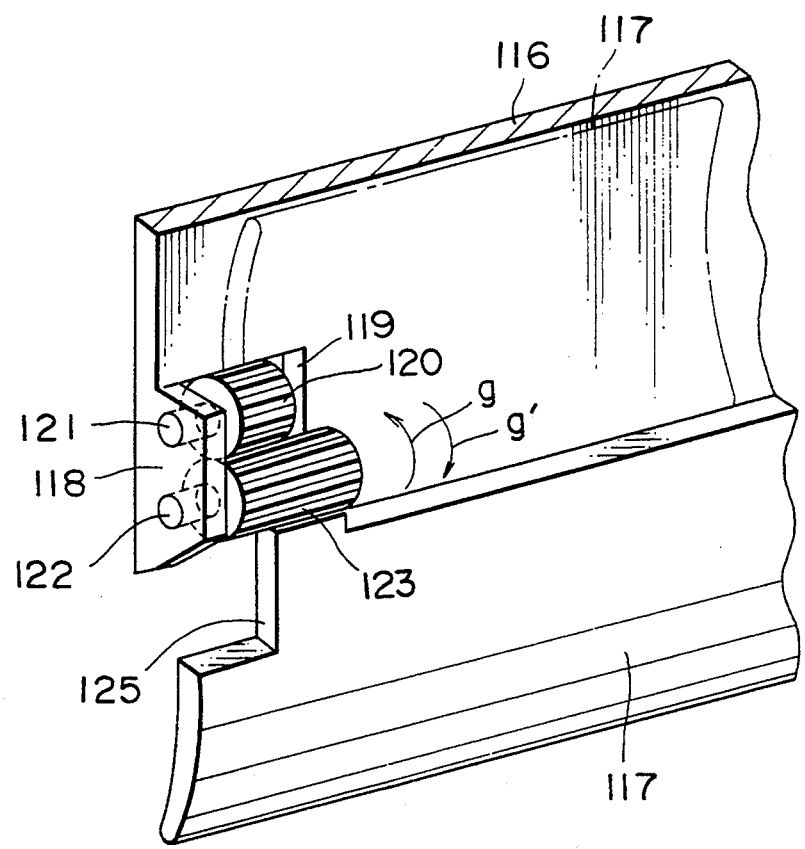
FIG. 12 is a perspective view of an essential part of the tape cassette shown in FIG. 9.

As shown in FIGS. 11 and 12, a pair of right and left lugs 118 are formed integrally with the upper inner lid 116 at the right and left ends (i.e., the longitudinal opposite ends) of the lower end portion thereof, respectively, so as to project from the back surface of the upper inner lid 116 (i.e., the right surface as viewed in FIGS. 10A and 10B). Further, a pair of right and left recesses 119 are formed at the right and left ends of the lower end portion of the upper inner lid 116 in adjacent relationship to the right and left lugs 118, respectively. A pair of right and left coaxial support shafts 121 project horizontally from the opposed inside surfaces of the right and left lugs 118 at the upper portions thereof, respectively. A pair of right and left drive pinions 120 are disposed in the right and left recesses 119 and are rotatably supported on the right and left support shafts 121, respectively.

A pair of right and left coaxial pivot pins 122 project horizontally from the opposed inside surfaces of the right and left lugs 118 at the lower portions thereof, respectively. A pair of right and left driven pinions 123 are disposed in the right and left recesses 119 and are rotatably supported on the right and left pivot pins 122, respectively. The right and left driven pinions 123 are in mesh with the right and left drive pinions 120, respectively. The right and left driven pinions 123 are connected integrally with the lower inner lid 117 at the right and left ends of the upper end portion thereof. Accordingly, the lower inner lid 117 is pivotable together with the driven pinions 123 in response to rotation of the latter about the pivot pins 122.

As shown in FIGS. 10A, 10B and 11, a pair of right and left racks 124 are arcuately formed on a pair of right and left inside walls of the cassette body 101 perpendicular to the right and left inside walls 101b so as to form an arc about the common axis of the pivot pins 105. The right and left drive pinions 120 are in mesh with the right and left racks 124, respectively. Further, as shown in FIG. 12, a pair of right and left recesses 125 are formed at the right and left ends of the lower inner lid 117 at the upper portion thereof, so as to prevent interference of the lower inner lid 117 with the lugs 118 and the drive pinions 120 during pivotal movement of the lower inner lid 117. Further, an upper lid 126 is pivotably connected through a pair of right and left pivot pins 127 having a common axis to the upper plate 104c of the outer lid 104 at the central portion thereof.

The operation of the second preferred embodiment having the above-mentioned construction will now be described with reference to FIGS. 10A to 13B.

Figure 13A:
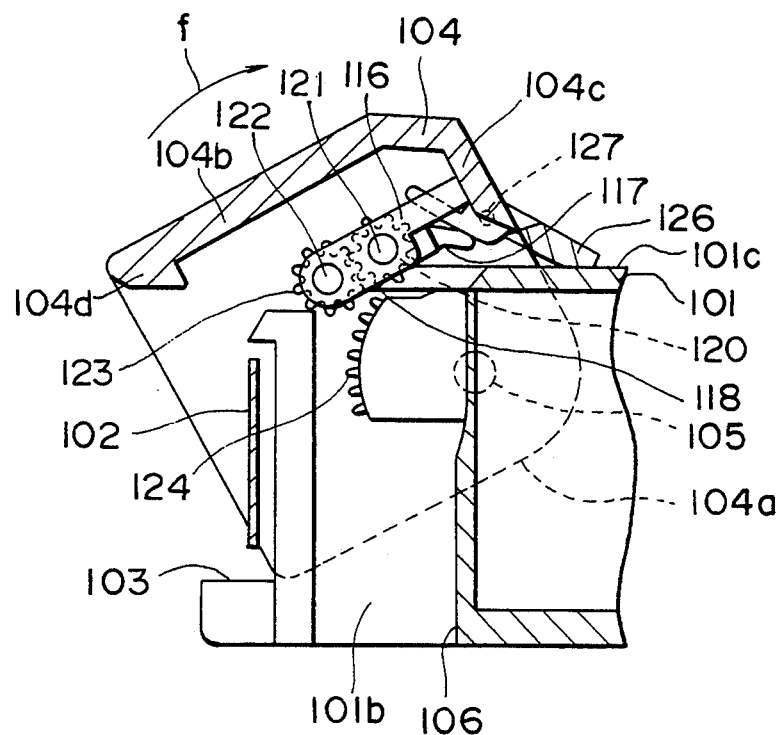
FIG. 13A is a cross section taken along the line XIII—XIII in FIG. 11, and illustrating the open condition of the outer lid.
Figure 13B:
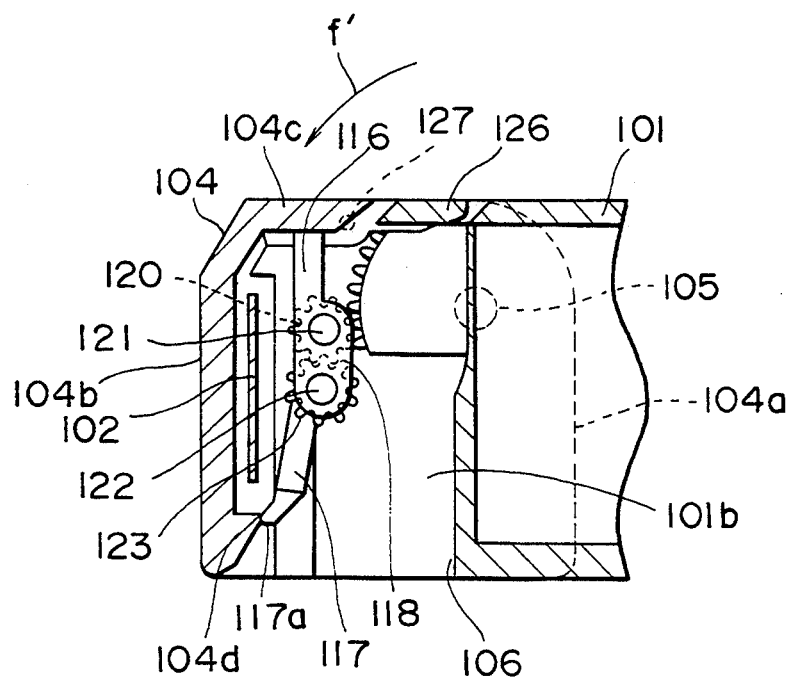
FIG. 13B is a view similar to FIG. 13A, but illustrating the closed condition of the outer lid.

In the condition shown in FIGS. 10B and 13B, the outer lid 104 is in the closed position to close the front opening 103 so that the front and upper sides of the magnetic tape 102 are covered with the front plate 104b and the upper plate 104c of the outer lid 104, respectively, and the front plate 104b and the upper plate 104c are in the vertical and horizontal positions, respectively. In this condition, the lower inner lid 117 is in an extended, edge-to-edge position or depends downward from the upper inner lid 116 so that a lower edge 117a of the lower inner lid 117 abuts against a lower edge 104d of the front plate 104b of the outer lid 104. Thus, the front and back sides and the upper and lower sides of the magnetic tape 102 stretched across the front opening 103 are fully covered with the front plate 104b and the upper plate 104c of the outer lid 104, the upper inner lid 116 and the lower inner lid 117. Further, the upper lid 126 is horizontally disposed at its rear end portion on the right and left inside walls 101b of the cassette body 101.

Accordingly, the dustproof effect for the magnetic tape 102 can be improved to protect the magnetic tape 102 from dust.

When the outer lid 104 is pivoted about the common axis of the right and left pivot pins 105 in the direction of the arrow f from the closed position shown in FIGS. 10B and 13B to the open position shown in FIGS. 10A and 13A, the upper inner lid 116 is raised together with the outer lid 104 in the direction of the arrow f.

Accordingly, the right and left drive pinions 120 are raised together with the upper inner lid 116 through the right and left support shafts 121 in the direction of the arrow f.

During the raising of the right and left drive pinions 120 in the direction of the arrow f, the right and left drive pinions 120 are rotationally driven by the right and left racks 124, respectively. That is, the right and left drive pinions 120 are rotated about the right and left support shafts 121 in a direction depicted by an arrow h, respectively.

As a result, the right and left driven pinions 123 are rotationally driven by the right and left drive pinions 120 in a direction depicted by an arrow g, respectively. That is, the right and left driven pinions 123 are rotated about the right and left pivot pins 122 in the direction of the arrow g, respectively. Since the right and left driven pinions 123 are integral with the lower inner lid 117, the lower inner lid 117 is pivoted together with the driven pinions 123 about the pivot pins 122 in the direction of the arrow g so as to move away from the magnetic tape 102 to a retracted position folded-back against the upper inner lid 116. Thus, the lower inner lid 117 is pivotally raised in the direction of the arrow g to substantially the same level as that of the upper inner lid 116.

Since the direction of pivotal movement of the lower inner lid 117 shown by the arrow g is away from the magnetic tape 102, there is no possibility of the magnetic tape 102 being damaged by the lower inner lid 117 during the pivotal movement thereof. During the raising of the outer lid 104, the upper lid 126 is pivoted about the common axis of the pivot pins 127 in a direction depicted by an arrow i, and is slid on an upper surface 101c of the cassette body 101. Thus, the front and back sides and the upper and lower sides of the magnetic tape 102 are fully uncovered.

On the other hand, when the outer lid 104 is lowered from the open position shown in FIGS. 10A and 13A to the closed position shown in FIGS. 10B and 13B in the direction of the arrow f', the operation is carried out in a manner reverse to that described above. That is, the pinions 120 are lowered in the direction of the arrow f', and are simultaneously rotated about the support shafts 121 in a direction as depicted by an arrow h'. Accordingly, the lower inner lid 117 is pivoted together with the driven pinions 123 about the pivot pins 122 in a direction as depicted by an arrow g', so that the lower inner lid 117 is pivotally lowered relative to the upper inner lid 116.

As mentioned above, in raising the upper inner lid 116 together with the outer lid 104 in the direction of the arrow f to the open position, the lower inner lid 117 can be pivotally raised to substantially the level of the upper inner lid 116. That is, the upper inner lid 116 and the lower inner lid 117 can be raised to a sufficiently high level by pivoting the outer lid 104 through a relatively small angle.

Accordingly, as shown in FIG. 10A, a sufficient opening amount $H_2$ of the front opening 103 can be ensured with a reduced raising mount $H_1$ of the outer lid.

While a second specific embodiment of the present invention has been described above with reference to FIGS. 9-13b, the present invention is not limited to the preferred embodiment, but various modifications may be made therein within the scope of the present invention.

For example, the drive pinions 120 and the driven pinions 123 may be replaced by a pair of friction drive rollers and a pair of friction driven rollers such as rubber rollers, respectively; and the racks 124 may be replaced by a pair of friction drive surfaces formed by attaching rubber plates to the inside walls of the cassette body 101, for example. In this case, when the upper inner lid 116 is raised or lowered in the direction of the arrow f or f', the friction drive rollers are rotationally driven by the friction drive surfaces, and the friction driven rollers are simultaneously driven by the friction drive rollers, thereby pivoting the lower inner lid 117 relative to the upper inner lid 116 in the direction of the arrow g or g'.

Further, the second preferred embodiment of the present invention is also not limited to a video cassette for use with a VTR, but it may be applied to various tape cassettes for use with various recording and reproducing apparatus.

What is claimed is:

1. A tape cassette accommodating a magnetic tape therein, comprising:
    a cassette body having a front opening across which a run of the tape is guided;
    an outer lid pivotally mounted on said cassette body for pivotal movements between a closed position covering an outer surface of said run of the tape extending across said front opening and an opened position in which said outer lid is raised above said run of the tape;
    a first inner lid mounted on said outer lid and thereby pivoted in respect to said cassette body upon movement of said outer lid for covering an upper portion of an inner surface of said run of the tape in said closed position of said outer lid and for rising above said run of the tape in said opened position of the outer lid;
    a second inner lid mounted on said first inner lid for sliding movement relative to the latter between an extended edge-to-edge position and a retracted overlapping position approximately coextensive with said first inner lid; and
    driving means for sliding said second inner lid relative to said first inner lid in response to said pivotal movements of said outer lid so that said second inner lid is in said extended position for covering a lower portion of said inner surface of the run of the tape when said outer lid is in said closed position and so that said second inner lid is in said retracted position and thereby raised above said run of the tape when said outer lid is in said opened position.

2. The tape cassette as defined in claim 1, wherein said driving means includes a first rack on said cassette body, a second rack on said second inner lid, and a pinion interposed between said first rack and said second rack and being rotatably mounted on said first inner lid so as to be turned by rolling along said first rack upon said movement of the outer lid, with turning of said pinion causing displacements of said second rack and of said second inner lid therewith.

3. The tape cassette as defined in claim 1, wherein said first inner lid is pivotably connected to said outer lid, and further comprising a guide pin on said first inner lid, and a guide groove formed in said cassette body for guiding said guide pin and thereby establishing orientation of said first inner lid relative to said outer lid in said closed and opened positions of said outer lid.

4. The tape cassette as defined in claim 2, wherein said first rack, said second rack and said pinion are located at each of the longitudinal opposite ends of said first inner lid and said second inner lid.

5. The tape cassette as defined in claim 3, wherein said guide pin and said guide groove are located at each of the longitudinal opposite ends of said first inner lid.

6. The tape cassette as defined in claim 1, wherein said driving means includes a first friction surface on said cassette body, a second friction surface on said second inner lid, and a friction roller interposed between said first friction surface and said second friction surface and being rotatably mounted on said first inner lid.

7. A tape cassette accommodating a magnetic tape therein, comprising:
    a cassette body having a front opening across which a run of the tape is guided;
    an outer lid pivotally mounted on said cassette body for pivotal movements between a closed position covering an outer surface of said run of the tape and an opened position in which said outer lid is raised above said run of the tape;
    a first inner lid mounted on said outer lid and thereby pivoted in respect to said cassette body upon movement of said outer lid for covering an upper portion of an inner surface of said run of the tape in said closed position of said outer lid and for rising above said run of the tape in said opened position of the outer lid;
    a second inner lid pivotably mounted on said first inner lid at a lower edge thereof for pivotal movements relative to said first inner lid between an extended position in edge-to-edge relation with said lower edge and a retracted position folded-back against said first inner lid so as to be approximately coextensive with said first inner lid; and
    driving means for pivoting said second inner lid relative to said first inner lid in response to said pivotal movements of said outer lid so that said second inner lid is in said extended position for covering a lower portion of said inner surface of the run of the tape when said outer lid is in said closed position and so that said second inner lid is in said retracted folded-back position and thereby raised above said run of the tape when said outer lid is in said opened position.

8. The tape cassette as defined in claim 7, wherein said driving means includes a rack on said cassette body, a first pinion rotatably mounted on said first inner lid and meshing with said rack so that said first pinion is turned by rolling along said rack upon said movement of the outer lid, and a second pinion fixed to said second inner lid and meshing with said first pinion so as to be turned by the latter for effecting said pivotal movements of the second inner lid.

9. The tape cassette as defined in claim 7, wherein said second inner lid is pivoted by said driving means so as to move angularly away from said outer lid in response to said pivotal movement of said outer lid from said closed position to said opened position of said outer lid.

10. The tape cassette as defined in claim 8, wherein said first pinion and said second pinion are located at each of the longitudinal opposite ends of said first inner lid and said second inner lid.

11. The tape cassette as defined in claim 7, wherein said driving means includes a friction surface on said cassette body, a first friction roller rotatably mounted on said first inner lid and contacting with said friction surface so that said first friction roller is turned by rolling along said friction surface upon said movement of the outer lid, and a second friction roller fixed to said second inner lid and contracting with said first friction roller so as to be turned by the latter for effecting said pivotal movements of the second inner lid.

* * * * *